United States Patent
Prabhu

(10) Patent No.: US 9,686,217 B2
(45) Date of Patent: Jun. 20, 2017

(54) METHOD TO STOP CYBER-BULLYING BEFORE IT OCCURS

(71) Applicant: Trisha N. Prabhu, Naperville, IL (US)

(72) Inventor: Trisha N. Prabhu, Naperville, IL (US)

( * ) Notice: Subject to any disclaimer, the term of this patent is extended or adjusted under 35 U.S.C. 154(b) by 71 days.

(21) Appl. No.: 14/738,874

(22) Filed: Jun. 13, 2015

(65) Prior Publication Data

US 2015/0365366 A1    Dec. 17, 2015

Related U.S. Application Data

(60) Provisional application No. 62/012,296, filed on Jun. 14, 2014.

(51) Int. Cl.

| | |
|---|---|
| *G06F 15/16* | (2006.01) |
| *H04L 12/58* | (2006.01) |
| *G06F 3/0484* | (2013.01) |
| *H04L 12/24* | (2006.01) |
| *H04L 29/06* | (2006.01) |

(52) U.S. Cl.
CPC .......... *H04L 51/12* (2013.01); *G06F 3/04842* (2013.01); *H04L 12/242* (2013.01); *H04L 41/0604* (2013.01); *H04L 51/046* (2013.01); *H04L 12/585* (2013.01); *H04L 29/06578* (2013.01); *H04L 51/32* (2013.01)

(58) Field of Classification Search
USPC ....................................................... 709/206
See application file for complete search history.

(56) References Cited

U.S. PATENT DOCUMENTS

| | | | | |
|---|---|---|---|---|
| 8,838,719 | B1 * | 9/2014 | Faulk | H04L 51/043 709/203 |
| 2004/0176944 | A1 * | 9/2004 | Noda | G06F 17/2217 704/3 |
| 2006/0242306 | A1 * | 10/2006 | Boro | G06F 21/62 709/227 |
| 2006/0282369 | A1 * | 12/2006 | White | 705/37 |
| 2008/0134282 | A1 * | 6/2008 | Fridman | G06Q 10/10 726/1 |
| 2008/0307339 | A1 * | 12/2008 | Boro | G06F 7/06 715/764 |

(Continued)

FOREIGN PATENT DOCUMENTS

| | | | | |
|---|---|---|---|---|
| CN | EP 09812642 A | * | 9/2009 | H04L 12/585 |
| CN | EP 2328309 A1 | * | 6/2011 | H04L 12/585 |

*Primary Examiner* — Aftab N. Khan
(74) *Attorney, Agent, or Firm* — Fish & Richardson P.C.

(57) ABSTRACT

A method to stop cyber-bullying before it occurs by alerting the user (potential bully) to pause, review and rethink before posting a hurtful messages to the recipient (potential victim(s)) is the essence of this patent. ReThink is designed to be setup as an optional software installed as an extension, plugin or add-on on web browsers and as a customized keyboard or add-on app on mobile platforms (smart phones, cell phones, tablets, phablets, mobile devices) that detects hurtfulness on all text, image or videos posted or shared on the internet in all languages by a user. Upon detection, ReThink alerts the user to rethink the decision before posting message and provides a chance for the user to edit message to make it non-hurtful to recipients. ReThink is backed by a sound scientific research that has found that the ReThink method prevents cyber-bullying over 93% of the time in adolescent users.

13 Claims, 2 Drawing Sheets

(56) References Cited

U.S. PATENT DOCUMENTS

| | | | |
|---|---|---|---|
| 2009/0019121 A1* | 1/2009 | Mears | G06Q 10/107 709/206 |
| 2009/0113001 A1* | 4/2009 | Manning et al. | 709/206 |
| 2012/0011192 A1* | 1/2012 | Meister | G06Q 10/107 709/203 |
| 2012/0246222 A1* | 9/2012 | Martin | G06Q 30/00 709/203 |
| 2013/0278385 A1* | 10/2013 | Baskin et al. | 340/7.51 |
| 2013/0340089 A1* | 12/2013 | Steinberg | H04L 63/10 726/27 |
| 2014/0229557 A1* | 8/2014 | Dietz | H04L 12/1822 709/206 |
| 2015/0058242 A1* | 2/2015 | Bucciarelli | G06Q 50/265 705/325 |
| 2015/0100913 A1* | 4/2015 | Park | G06F 21/83 715/773 |
| 2015/0180746 A1* | 6/2015 | Day, II | H04L 51/16 455/405 |
| 2016/0098392 A1* | 4/2016 | Clarke | G06F 21/6245 713/168 |

\* cited by examiner

METHOD TO STOP CYBER-BULLYING BEFORE IT OCCURS

CROSS-REFERENCE TO RELATED APPLICATIONS

This application claims the benefit of the filing date of Provisional Patent Application No. 62/012,296 filed Jun. 14, 2014.

STATEMENT REGARDING FEDERALLY SPONSORED RESEARCH OR DEVELOPMENT

NOT APPLICABLE

THE NAMES OF THE PARTIES TO A JOINT RESEARCH AGREEMENT NOT APPLICABLE

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

NOT APPLICABLE

STATEMENT REGARDING PRIOR DISCLOSURES BY THE INVENTOR OR A JOINT INVENTOR

NOT APPLICABLE

BACKGROUND OF THE INVENTION

Field of the Invention

Cyber-bullying is bullying that takes place using electronic technology. Electronic technology includes devices and equipment such as cell phones, computers, and tablets as well as communication tools including social media sites, text messages, chat, and websites. Examples of cyber-bullying include mean text messages or emails, rumors sent by email or posted on social networking sites, and embarrassing pictures, videos, websites, or fake profiles.

Recent research shows that a significant portion of the adolescent (12-18) users in United States of America online have experienced cyber-bullying. Over 38% of those victims that have been repeatedly cyber-bullied suffer from suicidal tendencies. Victims suffer from depression, low self-esteem, and higher school drop-out rates. Research also shows that the negative effects of cyber-bullying can affect victims into their 50s and 60s.

According to studies at American Academy of Child & Adolescent Psychiatry, the adolescent brain function differently than adults when decision-making and problem solving. The adolescent brain's pre-frontal cortex, which is part of the frontal lobe, is not developed. Research shows that for this reason, adolescents are more likely to act on impulse and are less likely to pause and think to consider the potential consequences of their actions before they act.

Reactive solutions to cyber-bullying exist and are popular on existing social media sites. Such reactive features can include but are not limited to: blocking features, which include blocking cyber-bullies at victim's request, reporting users that are bullying others, etc. Due to the fact that these solutions are reactive and aim to stop the cyber-bullying after it has happened, these features often prove to be ineffective as long-term solutions to stop cyber-bullying.

Reactive solutions are also often not embraced by victims of cyber-bullying. Research has found that 9 out of 10 times, adolescent victims of cyber-bullying do not report their situation to a parent/guardian and suffer in silence.

ReThink employs a unique method to proactively stop cyber-bullying before it occurs. Research related to the decision-making process that occurs in the frontal lobe of the brain has determined that that process occurs in the following steps:

a. The Situation: Adolescents need to realize they need to stop/think in an important situation
b. Think: Adolescents need to think about the possible choices/consequences in a situation
c. Their Decision: Adolescents need to decide what to do
d. Evaluate their Decision Later: Later, adolescents evaluate whether they could've made a better decision.

The inventor developed the ReThink product that detects hurtful messages before they are posted, disseminated, sent or shared and gives users a second chance to reconsider their decision by providing them the opportunity to pause, review, and rethink. Users can then decide to edit message, or continue to post the message that prompted the ReThink alert. The inventor conducted an internationally acclaimed 1500 trial study that proved that over 93% of the time, adolescents (ages 12-18) who had originally been willing to post an offensive message changed their mind and decided against their initial decision.

Description of Related Art Including Information Disclosed Under 37 CFR 1.97 and 1.98

NOT APPLICABLE

BRIEF SUMMARY OF THE INVENTION

At least one embodiment of the present invention describes a computer-implemented method for detecting hurtful messages that carry negative sentiments to be posted or disseminated or sent by a potential cyber-bully on a social media site on web browser and mobile platforms, is being provided a ReThink alert suggesting the user to pause, review and rethink their decision before posting that hurtful message. For purposes of this patent application, the web browser (commonly referred to as a browser) is a software application for retrieving, presenting and traversing information resources on the World Wide Web platforms capable of internet access, web page display, alerts, and pop-ups. A browser extension is a computer program that extends the functionality of a web browser in some way. Depending on the browser and the version, the term may be distinct from similar terms such as plug-in or add-on. Mobile platforms refer to the software enabled mobile devices or smartphones, which are mobile telephone devices which incorporates a hand-held computer with its own operating system, and which is capable of internet access, data storage, e-mail and SMS text communications. The term "mobile platforms" and "mobile phones" referred in this document refer to mobile devices, smart phones, cell phones, tablets and phablets running on a variety of mobile operating systems. The web browsers and mobile operating system (OS) provides a standardized interface and platform for compatible application software.

At least one embodiment of the present invention consists of ReThink software setup on web browsers wherein the ReThink software is installed, setup and configured as an extension available on a browser's store where typically apps and extensions are downloaded. As with any other extension or plugin, ReThink software may be enabled or disabled at the user or administrator's will.

At least one embodiment of the present invention consists of ReThink software optional setup on mobile devices from a mobile platform store, from where the ReThink software may be downloaded, installed, setup and configured. This setup is done by installing ReThink software on the mobile device in the form of a new customized, optional keyboard that enhances the functionality of detecting what is typed on the keyboard to detect hurtful messages for all text based communications.

At least one embodiment of the present invention provides a user interface for ReThink software's administration module on web browsers wherein the administrators would be able to establish security measures, including a password, to access the ReThink software's settings. This controls access to modifications by authorized access so as to disallow an unauthorized user from making changes at their will to override any settings that their administrators have put in place.

At least one embodiment of the present invention provides a user interface for ReThink software's administration module on web browsers which the administrators use to determine the social media sites to be ReThink-enabled. This may include all or any of text-based, image-based, video-based social media sites or any other website that an administrator or user believes may benefit from the ReThink functionality.

At least one embodiment of the present invention describes functioning of ReThink software on web platforms in which a user (potential cyber-bully) attempts to send or disseminate or post a hurtful message to a recipient (potential victim) on a social media site on the Internet. Using the social media site's "post" or "send" button or simply an "enter" key board action or any other action that results in a post or send or dissemination of the hurtful message, presents a ReThink alert to the user in the form of an alert message on the web site where the communication is happening, with a message that encourages potential cyber-bully to rethink their decision before posting that message.

At least one embodiment of the present invention describes functioning of ReThink software on mobile platforms in which user (potential cyber-bully) attempts to type or send a hurtful message to a potential victim on the internet using the customized optional ReThink keyboard on mobile device. Clicking the customized ReThink keyboard's "post" button or the "enter" button or a tap or a click on the phone, that results in a post action or dissemination or sending of the hurtful message on the phone, presents a ReThink alert to the user (potential cyber-bully) as a form of an alert on the display area of the mobile device where the communication is happening, with a message that encourages the user to rethink their decision to post that message.

At least one embodiment of the present invention describes functioning of ReThink software on web browsers which presents an alert which consists of two user interface buttons—"Edit message" button that is meant for user (potential cyber-bully) to edit the message and make it not hurtful and subsequently post or disseminate or send that non-hurtful message; "Post" button that is meant for the user (potential cyber-bully) to go ahead and post or disseminate or send that message ignoring the ReThink alert.

At least one embodiment of the present invention describes functioning of ReThink software on mobile platforms which presents an ReThink alert which consists of two user interface buttons—"Edit Message" button that is meant for user (potential cyber-bully) to edit the message and make it not hurtful and subsequently post that non-hurtful message; "Post" that is meant for the user (potential cyber-bully) to go ahead and post or disseminate or send that message overriding the ReThink alert.

DETAILED DESCRIPTION OF THE INVENTION

Figure 1:
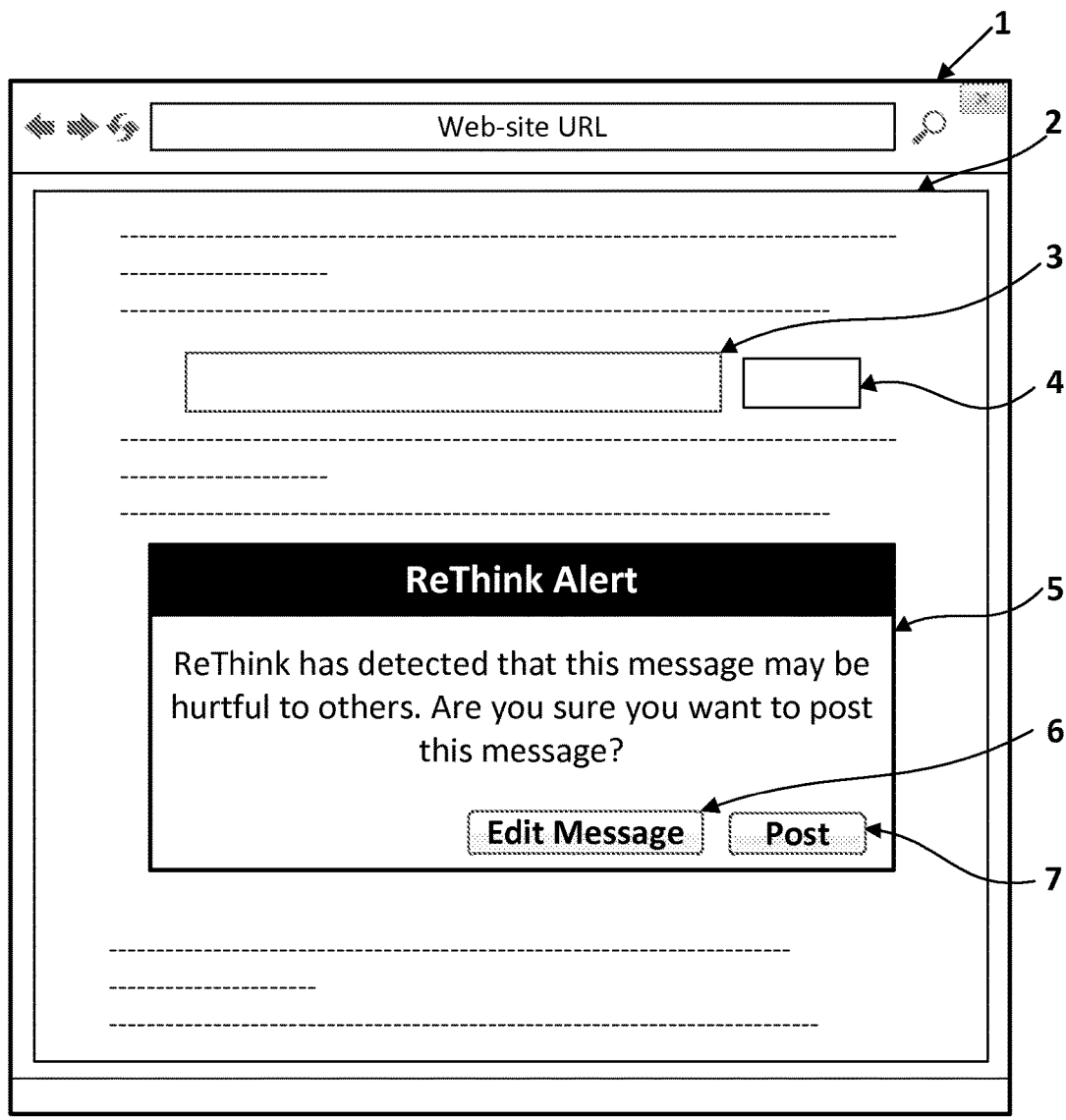
FIG. 1 comprises of a scenario depicting how ReThink provides users a chance to pause, review and rethink by alerting the user before hurtful messages are posted and allowing users to "Edit message" or "Post" the message on web browsers in the preferred embodiment of the present invention.

FIG. 1 is just one representation of how a ReThink enabled website may function on web browsers. Web-site 1 represents a website on a ReThink enabled web browser. Area 2 represents a message interface on the website. Box 3 represents the hurtful message attempted to be posted by a user. Button 4 represents the button or widget that upon a clicking or tapping or swiping or mouse-over sends, posts or disseminates that hurtful message. When button 4 is actioned, a ReThink alert 5 is presented to the user that detects this hurtful message before it was disseminated, sent or posted and provides user a chance to pause, review and rethink the decision to send that message. Button 6 represents the "Edit Message" button that allows for the user to edit the message to change, modify or delete to make it not hurtful and subsequently post, send or disseminate. Button 7 represents the "Post" button that allows for the user to go-ahead and post, send or disseminate the message although it is hurtful, thereby ignoring ReThink alert.

Figure 2:
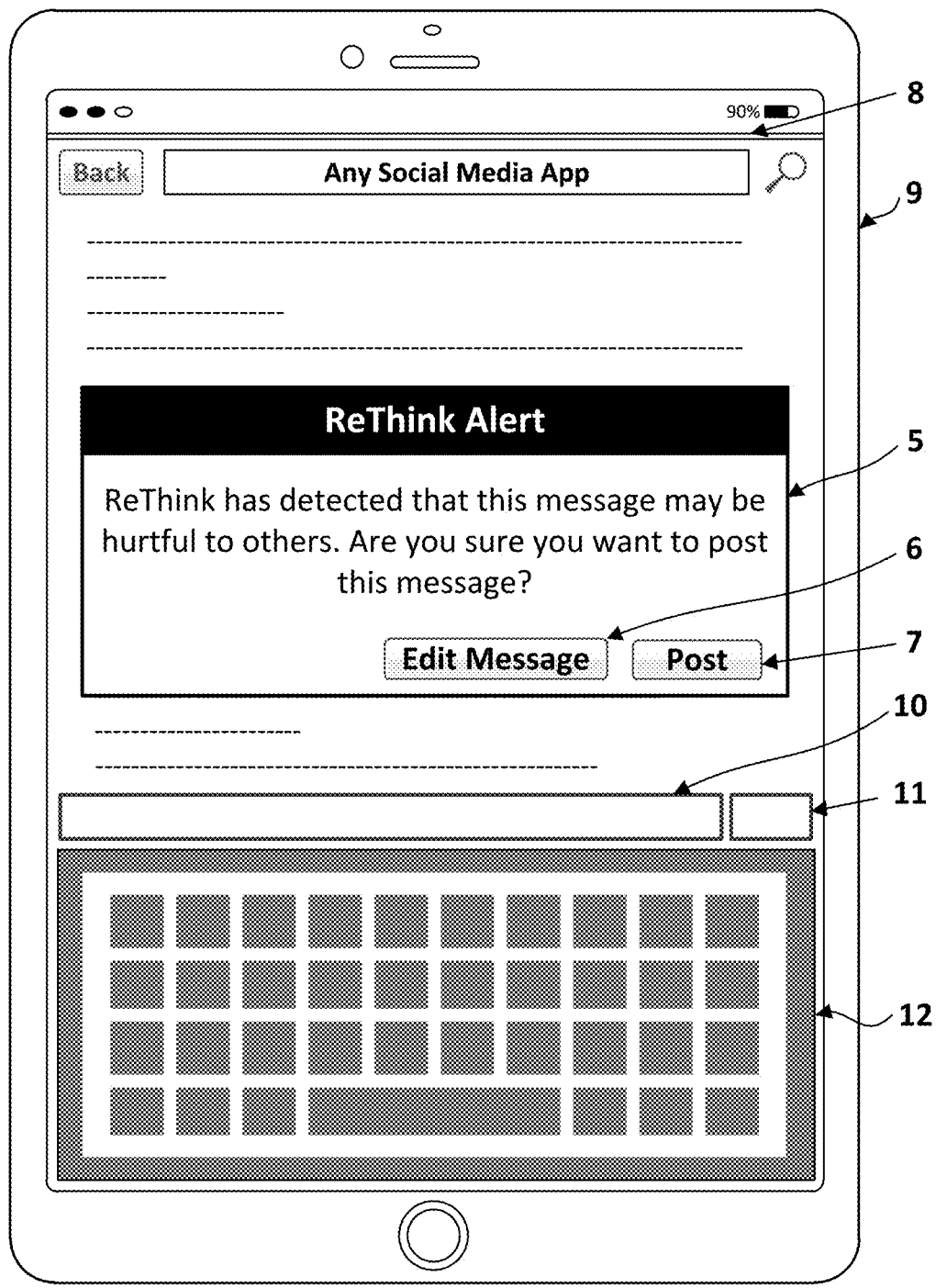
FIG. 2 comprises of a scenario depicting how ReThink provides users a second chance to pause, review and rethink by alerting the user before hurtful messages are posted and allowing user to either "Edit message" or "Post" the message on mobile devices in the preferred embodiment of the present invention.

FIG. 2 is a just one representation of how a ReThink enabled app or website may function on mobile platforms. Device 9 represents the mobile device. Screen 8 represents an application ("app") on a mobile device. Box 10 represents a hurtful message that is being typed on the new, customized, optional, ReThink keyboard 12. Button 11 represents the button or widget that upon a clicking or tapping or swiping or mouse-over action would send, post or disseminate this hurtful message to the recipient. When button 11 is actioned, a ReThink alert 5 is presented to the user as it detects this hurtful message before it is being disseminated, sent or posted, and allows for the user to pause, review and rethink the decision to send that message. The user has the opportunity to click "Edit message" button 6 that allows for the user to edit the message to change, modify or delete to make it not hurtful and subsequently post, send or disseminate. User may also click the "Post" button 7 that allows for the user to go-ahead and post, send or disseminate the message although it is hurtful, thereby ignoring ReThink alert.

The invention claimed is:

1. A method comprising:

receiving, by a mobile device, content data from a user that is input into a messaging application for inclusion in a message using a customized keyboard application that has been modified to interface with a content filtering application, wherein the message is not an email message, wherein the content data includes content defined by one or more keystrokes and the customized keyboard application (i) executes on the mobile device and (ii) is configured to route the content defined by the one or more keystrokes entered using the customized keyboard application to a content filtering application in response to the user interacting with a message submit icon associated with the messaging application;

receiving, by the mobile device, data indicative of a selection of the message submit icon;

in response to receiving data indicative of the selection of the message submit icon, transmitting a message analysis request to the content filtering application that is configured to analyze the content defined by the one or more keystrokes;

receiving data from the content filter application that indicates that the content defined by the one or more keystrokes is associated with an offensive content alert trigger word;

determining, based on the data received from the content filtering application, that the content defined by the one or more keystrokes includes an offensive content alert trigger word;

providing, by the mobile device that received the one or more keystrokes and based upon the received data, an alert to the user via a display of the same mobile device that received the one or more keystrokes that prompts the user to rethink whether the user wants to send the message, wherein the alert includes a popup or notification that includes (i) an audio message or (ii) a video message that appears in the display in response to the user's attempt to send the message that includes the offensive content alert trigger word, wherein the alert includes two selectable icons that include (i) an edit message selectable icon, and (ii) a send offensive message selectable icon; and in response to receiving a selection of the edit message selectable icon, providing a user interface that allows the user to edit the content data associated with the message to change the content data of the message so that the content data of the message no longer includes content data that is associated with the particular offensive content alert trigger word; or in response to receiving a selection of the send offensive message selectable icon, sending the message that includes the offensive content alert trigger word without editing the content data of the message.

2. The method of claim 1, wherein the alert includes (i) a notification that indicates the effect the message can have on the recipient, (ii) encourages the user to rethink their decision to post the message, or (iii) both.

3. The method of claim 1, wherein the customized keyboard application is a browser extension, plugin, or add-on.

4. The method of claim 1, wherein the customized keyboard application is downloaded from a web browser store.

5. The method of claim 1, wherein the customized keyboard on the mobile device is downloaded from a mobile device app store.

6. The method of claim 1, the method further comprising:
receiving a request to revert back to a keyboard that is different than the customized keyboard; and
in response to receiving a request to revert back to a keyboard that is different than the customized keyboard, changing a current keyboard that is utilized by the mobile device from the customized keyboard to (i) a keyboard that was utilized prior to installation of the customized keyboard, (ii) a default keyboard, or (iii) another keyboard selected by the user.

7. The method of claim 1, wherein the content filtering application detects messages that include content data that is associated with the offensive content alert trigger word based on (i) detecting hurtful words present in the content data using text matching, sentiment analysis, or both in one or more languages, or (ii) detecting hurtful words present in the content data that are associated with negative sentiments in one or more languages, or (iii) detecting a hurtful message in the content data using text matching, sentiment analysis, or both to identify text that is associated with negative sentiments based on the context of the text in one or more languages.

8. The method of claim 1, the method further comprising:
receiving a request to revert back to a keyboard that is different than the customized keyboard; and
in response to receiving a request to revert back to a keyboard that is different than the customized keyboard, changing a current keyboard that is utilized by the mobile device from the customized keyboard to (i) a keyboard that was utilized prior to installation of the customized keyboard, (ii) a default keyboard, or (iii) another keyboard selected by an administrator.

9. The method of claim 1, wherein the message includes an SMS message or a social media post.

10. The method of claim 1, wherein the message submit icon includes an SMS message send icon or a social media post icon.

11. The method of claim 1, wherein the messaging application includes an SMS messaging application or a social media application.

12. The method of claim 1, wherein the content filtering application detects an image-based message or a video-based message that includes hurtful content based on detecting whether the message includes content data that is associated with a particular offensive content alert trigger word.

13. The method of claim 12, wherein the content filtering application detects an image-based message or a video-based message that includes hurtful content based on detecting an image-based message or video-based message that is associated with negative sentiments, wherein detecting that an image-based message or a video-based message is associated with negative sentiments is based on (i) detecting one or more hurtful labels associated with an image in the image based message or one or more hurtful labels associated with a video in the video-based message or (ii) detecting an indication of hurtfulness detected from a context of a textual portion of a conversation in one or more languages that is associated with the image-based message or the video-based message.

* * * * *